US012627987B2

(12) United States Patent
Zhou et al.

(10) Patent No.: US 12,627,987 B2
(45) Date of Patent: May 12, 2026

(54) FIRST-PARTY APPLICATION DATA TRANSFER

(71) Applicant: WhatsApp LLC, Menlo Park, CA (US)

(72) Inventors: Ming Zhou, Pasadena, CA (US); Alison Luiz de Oliveira Chaves, Redwood City, CA (US); William DeBruynkops, San Francisco, CA (US)

(73) Assignee: WhatsApp LLC, Menlo Park, CA (US)

( * ) Notice: Subject to any disclaimer, the term of this patent is extended or adjusted under 35 U.S.C. 154(b) by 111 days.

(21) Appl. No.: 18/438,294

(22) Filed: Feb. 9, 2024

(65) Prior Publication Data

US 2024/0276228 A1     Aug. 15, 2024

Related U.S. Application Data

(60) Provisional application No. 63/484,455, filed on Feb. 10, 2023.

(51) Int. Cl.
*H04W 12/77* (2021.01)
*G06K 19/06* (2006.01)
(Continued)

(52) U.S. Cl.
CPC ...... *H04W 12/77* (2021.01); *G06K 19/06037* (2013.01); *H04L 9/0869* (2013.01); *H04L 9/14* (2013.01)

(58) Field of Classification Search
CPC ... G06K 19/06037; H04L 9/0869; H04L 9/14; H04W 12/77
See application file for complete search history.

(56) References Cited

U.S. PATENT DOCUMENTS 8,108,445 B2 * 1/2012 Burckart ................. H04L 51/42
                                                       707/805
9,268,985 B2 * 2/2016 van der Merwe ....... G06K 7/12
                      (Continued)

FOREIGN PATENT DOCUMENTS

WO     WO 2018/065556 A1 * 12/2018 ............. H04L 12/18

OTHER PUBLICATIONS

Anika Schwind et al., WhatsAnalyzer: A Tool for Collecting and Analyzing WhatsApp Mobile Messaging Communication Data, 2018 30th International Teletraffic Congress (2018) (Year: 2018).*

*Primary Examiner* — Sharon S Lynch
(74) *Attorney, Agent, or Firm* — EVERSHEDS SUTHERLAND (US) LLP

(57) ABSTRACT

As disclosed herein, a computer-implemented method is provided. In one aspect, the computer-implemented method may include capturing, at a first client device hosting a messaging application, a context code generated for display in a graphical user interface of a second client device hosting the messaging application. The computer-implemented method may include determining, based on the context code, the second client device is authorized to receive from the first client device a dataset associated with a user account of the messaging application. The computer-implemented method may include establishing, based on determining the second client device is authorized, a peer-to-peer connection between the first client device and the second client device. The computer-implemented method may include transferring, by the peer-to-peer connection, the dataset and metadata associated with the dataset from the first client device to the second client device. A system and a non-transitory computer-readable storage medium are also disclosed.

18 Claims, 10 Drawing Sheets

400

402
CAPTURE, AT A FIRST CLIENT DEVICE HOSTING A MESSAGING APPLICATION, A CONTEXT CODE GENERATED FOR DISPLAY IN A GRAPHICAL USER INTERFACE OF A SECOND CLIENT DEVICE HOSTING THE MESSAGING APPLICATION

404
DETERMINE, BASED ON THE CONTEXT CODE, THE SECOND CLIENT DEVICE IS AUTHORIZED TO RECEIVE FROM THE FIRST CLIENT DEVICE A DATASET ASSOCIATED WITH A USER ACCOUNT OF THE MESSAGING APPLICATION

406
ESTABLISH, BASED ON DETERMINING THE SECOND CLIENT DEVICE IS AUTHORIZED, A PEER-TO-PEER CONNECTION BETWEEN THE FIRST CLIENT DEVICE AND THE SECOND CLIENT DEVICE

408
TRANSFER, BY THE PEER-TO-PEER CONNECTION, THE DATASET AND METADATA ASSOCIATED WITH THE DATASET FROM THE FIRST CLIENT DEVICE TO THE SECOND CLIENT DEVICE

(51) Int. Cl.
    *H04L 9/08*              (2006.01)
    *H04L 9/14*              (2006.01)

(56)             References Cited

U.S. PATENT DOCUMENTS

| | | | |
|---|---|---|---|
| 10,198,182 B2 * | 2/2019 | Adler | G06Q 10/06 |
| 10,318,154 B2 * | 6/2019 | Adler | H04L 9/3268 |
| 10,608,817 B2 * | 3/2020 | Haider | H04L 63/06 |
| 10,747,435 B2 * | 8/2020 | Adler | G06F 3/0604 |
| 11,042,878 B2 * | 6/2021 | Georgiadis | H04L 9/3213 |
| 11,082,221 B2 * | 8/2021 | Ebrahimi | G06F 16/2255 |
| 11,206,133 B2 * | 12/2021 | Ebrahimi | H04L 9/0869 |
| 11,362,847 B2 * | 6/2022 | Kim | H04L 67/02 |
| 11,451,523 B2 * | 9/2022 | Rawalkshatriya | H04L 63/06 |
| 11,582,179 B2 * | 2/2023 | Tu | H04W 12/08 |
| 11,669,244 B2 * | 6/2023 | Adler | G06F 3/0604 |
| | | | 713/176 |
| 11,695,582 B2 * | 7/2023 | Kim | H04L 12/1822 |
| | | | 709/206 |
| 11,777,726 B2 * | 10/2023 | Ebrahimi | H04L 63/083 |
| | | | 380/286 |
| 11,818,265 B2 * | 11/2023 | Ebrahimi | G06F 21/45 |
| 11,855,950 B2 * | 12/2023 | Lee | H04L 51/04 |
| 12,287,965 B2 * | 4/2025 | Adler | H04W 4/08 |
| 12,341,761 B2 * | 6/2025 | Khattak | H04L 63/107 |
| 2009/0138520 A1 * | 5/2009 | Burckart | H04L 51/42 |
| 2014/0045472 A1 * | 2/2014 | Sharma | H04L 12/1818 |
| | | | 455/416 |
| 2016/0026908 A1 * | 1/2016 | van der Merwe | H04B 10/116 |
| | | | 235/494 |
| 2016/0285791 A1 * | 9/2016 | Teng | H04L 51/04 |
| 2016/0337351 A1 * | 11/2016 | Spencer | H04L 63/0876 |
| 2016/0349999 A1 * | 12/2016 | Adler | G06Q 10/06 |
| 2016/0352526 A1 * | 12/2016 | Adler | G06F 3/0683 |
| 2018/0013562 A1 * | 1/2018 | Haider | H04L 9/0825 |
| 2019/0182042 A1 * | 6/2019 | Ebrahimi | H04L 9/3234 |
| 2019/0272101 A1 * | 9/2019 | Adler | G06Q 10/06 |
| 2019/0347007 A1 * | 11/2019 | Adler | G06Q 90/00 |
| 2020/0127826 A1 * | 4/2020 | Ebrahimi | G06F 21/32 |
| 2020/0280547 A1 * | 9/2020 | Rawalkshatriya | H04L 9/0891 |
| 2020/0293583 A1 * | 9/2020 | Tu | H04L 67/10 |
| 2021/0014060 A1 * | 1/2021 | Georgiadis | G06Q 20/3829 |
| 2022/0029802 A1 * | 1/2022 | Ebrahimi | G06F 21/64 |
| 2022/0255737 A1 * | 8/2022 | Ebrahimi | H04L 9/3234 |
| 2023/0259276 A1 * | 8/2023 | Adler | G06F 3/065 |
| | | | 713/176 |
| 2024/0205026 A1 * | 6/2024 | Small | H04L 9/3263 |

* cited by examiner

350
RECEIVING DEVICE

300K

Transfer Completed

Your Chat History and Media are Now Available on this Phone. Select Next to Continue.

Next 340
305-2

310
TRANSMITTING DEVICE

300J

Complete Setup on Receiving Device

Go to your Receiving Device and Complete setup.

Done 338
305-1

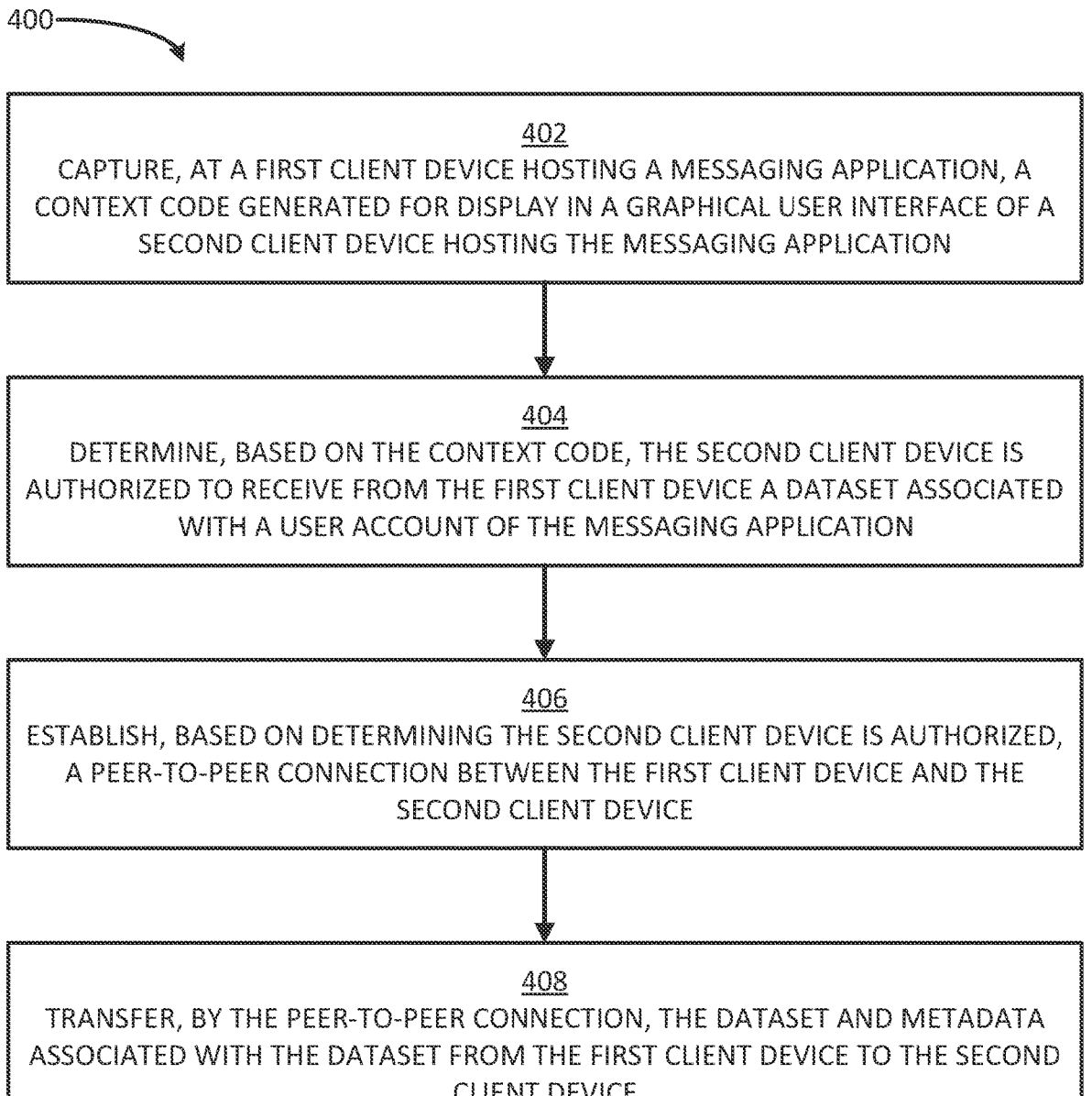

400

402
CAPTURE, AT A FIRST CLIENT DEVICE HOSTING A MESSAGING APPLICATION, A CONTEXT CODE GENERATED FOR DISPLAY IN A GRAPHICAL USER INTERFACE OF A SECOND CLIENT DEVICE HOSTING THE MESSAGING APPLICATION

404
DETERMINE, BASED ON THE CONTEXT CODE, THE SECOND CLIENT DEVICE IS AUTHORIZED TO RECEIVE FROM THE FIRST CLIENT DEVICE A DATASET ASSOCIATED WITH A USER ACCOUNT OF THE MESSAGING APPLICATION

406
ESTABLISH, BASED ON DETERMINING THE SECOND CLIENT DEVICE IS AUTHORIZED, A PEER-TO-PEER CONNECTION BETWEEN THE FIRST CLIENT DEVICE AND THE SECOND CLIENT DEVICE

408
TRANSFER, BY THE PEER-TO-PEER CONNECTION, THE DATASET AND METADATA ASSOCIATED WITH THE DATASET FROM THE FIRST CLIENT DEVICE TO THE SECOND CLIENT DEVICE

FIG. 4

FIRST-PARTY APPLICATION DATA TRANSFER

CROSS-REFERENCE TO RELATED APPLICATIONS

The present application claims the benefit of priority under 35 U.S.C. § 119(e) from U.S. Provisional Patent Application Ser. No. 63/484,455 entitled "FIRST-PARTY APPLICATION DATA TRANSFER," filed on Feb. 10, 2023, the disclosure of which is hereby incorporated by reference in its entirety for all purposes.

BACKGROUND

Field

The present disclosure generally relates to data transfer between mobile computing devices. More particularly, the present disclosure relates to local transfer of messaging (or "chat") application data from one mobile computing device to another computing device.

Related Art

Messaging applications have evolved to become integral parts of the daily lives of users, facilitating instant messaging, multimedia sharing, and collaboration. As a result, users generate extensive messaging histories. When it becomes desirable to change mobile devices, a user may wish to transfer messaging application data (e.g., messaging history or media files) from a current device to a next device. To accomplish this transfer, a user may rely on an intermediary, such as a third-party application or cloud storage service.

SUMMARY

The disclosed systems and methods provide a secure mechanism for locally transferring messaging application data from a first device to a second device without relying on a third-party application or service.

According to certain aspects of the present disclosure, a computer-implemented method is provided. The computer-implemented method may include capturing, at a first client device hosting a messaging application, a context code generated for display in a graphical user interface of a second client device hosting the messaging application. The computer-implemented method may include determining, based on the context code, the second client device is authorized to receive from the first client device a dataset associated with a user account of the messaging application. The computer-implemented method may include establishing, based on determining the second client device is authorized, a peer-to-peer connection between the first client device and the second client device. The computer-implemented method may include transferring, by the peer-to-peer connection, the dataset and metadata associated with the dataset from the first client device to the second client device.

According to another aspect of the present disclosure, a system is provided. The system may include one or more processors configured by machine-readable instructions. The processor(s) may be configured to capture, at a first client device hosting a messaging application, a context code generated for display in a graphical user interface of a second client device hosting the messaging application. The processor(s) may be configured to determine, based on the context code, the second client device is authorized to receive from the first client device a dataset associated with a user account of the messaging application. The processor (s) may be configured to establish, based on determining the second client device is authorized, a peer-to-peer connection between the first client device and the second client device. The processor(s) may be configured to transfer, by the peer-to-peer connection, the dataset and metadata associated with the dataset from the first client device to the second client device.

According to yet other aspects of the present disclosure, a non-transitory computer-readable storage medium having instructions embodied thereon, the instructions being executable by one or more processors to perform a method, is provided. The method may include capturing, at a first client device hosting a messaging application, a context code generated for display in a graphical user interface of a second client device hosting the messaging application. The method may include determining, based on the context code, the second client device is authorized to receive from the first client device a dataset associated with a user account of the messaging application. The method may include establishing, based on determining the second client device is authorized, a peer-to-peer connection between the first client device and the second client device. The method may include transferring, by the peer-to-peer connection, the dataset and metadata associated with the dataset from the first client device to the second client device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 4 is a flowchart illustrating steps in a method for transferring messaging application data from a transmitting device to a receiving device, according to some embodiments.

Figure 1:
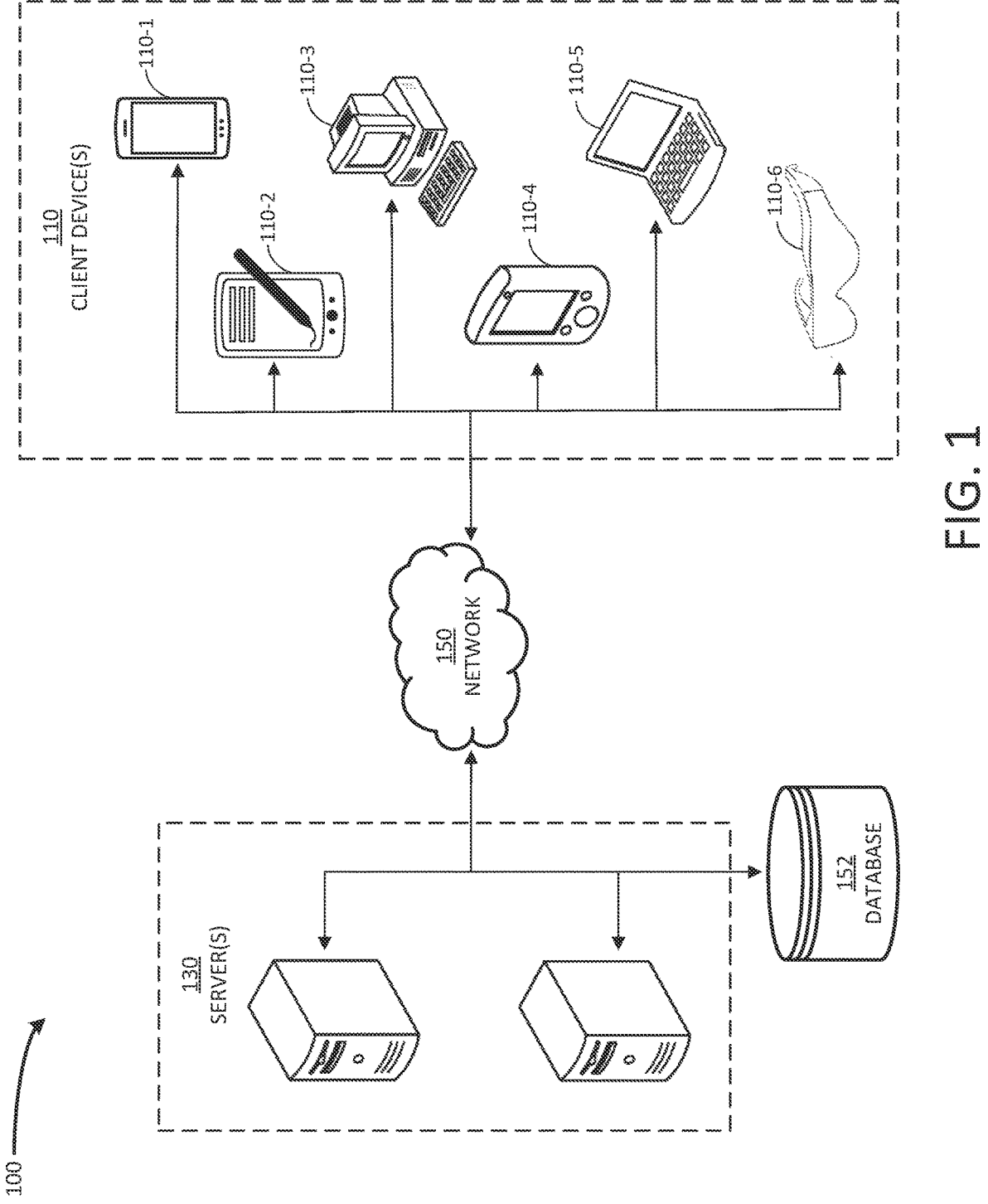
FIG. 1 illustrates a network architecture configured for end-to-end encrypted peer-to-peer data transfer for a messaging application, according to some embodiments.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Messaging (or "chat") applications have become an integral part of modern communication, enabling users to exchange messages, media, and information with ease. As a result, users generate extensive messaging (or "chat") histories. When it becomes desirable to change mobile devices, a user may wish to transfer messaging application data (e.g., messaging history or media files) from a current device to a next device. To accomplish this transfer, a user may rely on an intermediary, such as a third-party application or cloud storage service. However, these solutions raise concerns related to privacy, security, and real-time accessibility.

Existing solutions often depend on external servers for data storage and synchronization, leading to potential latency issues. Server-based solutions may also be susceptible to security breaches, potentially exposing the sensitive information of a user to unauthorized access. The increasing awareness of privacy issues and the desire for immediate and secure data access have prompted the need for a decentralized, first-party solution for transferring messaging application data.

As disclosed herein, novel systems and methods represent a significant advancement in the field of mobile communication by providing for the secure, direct transfer of messaging (or "chat") application data (e.g., messaging history or media files) from a first device to a second device associated with a user account. The disclosed approach prioritizes user privacy, security, and real-time accessibility, providing a more robust and efficient method for transferring messaging application data. The disclosed approach overcomes the need for third-party applications and services, reducing the risk of privacy breaches and enhancing data security.

Any user-specific information (e.g., personal information, sensitive information, etc.) entered or exchanged in the data transfer may be end-to-end encrypted (E2EE) and thus may be inaccessible by or hidden to back-end servers or other intermediary system components at all times from transmission to reception of data. E2EE may be understood to broadly include any technique where only the communicating end users may read or decipher the communicated messages, for example, by using cryptographic key(s) to decrypt the data.

While the end-to-end encryption of messaging application data may be solely facilitated by or implemented on E2EE-based communication networks, it may be understood that any type of communication system (e.g., non-E2EE communication systems, hybrid communication systems including both non-E2EE and E2EE-based systems) may perform the information exchange for cross-platform or cross-system communication as long as the user-specific portions of the information stay encrypted and inaccessible to intermediaries.

A Note on Data Privacy

The above brief summary is intended to serve as a non-limiting introduction to the concepts discussed in more detail below. However, before discussing further exemplary embodiments, a brief note on data privacy is provided. A more detailed description of the end-to-end encrypted interactive messaging techniques will be addressed in connection with the following Figures.

Some embodiments described herein make use of data or metrics that may include information voluntarily provided by one or more users. In such embodiments, data privacy may be protected in a number of ways.

For example, the user may be required to opt into any data collection before user data may be collected or used. The user may also be provided with the opportunity to opt out of any data collection. Before opting into data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy may be protected in other manners as well. Further details regarding data privacy are discussed below in the section describing network embodiments.

Assuming privacy conditions are satisfied, exemplary embodiments may be deployed in a wide variety of messaging systems, including messaging in a social network or on a mobile device (e.g., through a messaging client application or via short message service), among other possibilities.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments may be practiced without these specific details. In other instances, well known structures and devices are shown in block diagram form in order to facilitate a description thereof. The intention is to cover all modifications, equivalents, and alternatives consistent with the claimed subject matter.

Example System Architecture

FIG. 1 illustrates a network architecture 100 configured for end-to-end encrypted peer-to-peer data transfer for a messaging application (e.g., social networking application, social media application, standalone messaging application, instant messaging application, etc.), according to some embodiments. Network architecture 100 may include server(s) 130 and database 152, communicatively coupled with client device(s) 110 via network 150. Server(s) 130 may be configured to host a memory including instructions which, when executed by a processor, cause server(s) 130 to perform at least some of the steps in methods as disclosed herein. In some embodiments, the processor may be configured to control a graphical user interface (GUI) for the user of one of client device(s) 110 accessing a chat engine with a messaging tool. Accordingly, the processor may include a dashboard tool, configured to display components and graphic results to the user via the GUI. Server(s) 130 may include any device having an appropriate processor, memory, and communications capability for hosting the chat engine including multiple tools associated with it. The chat engine may be accessible by various client(s) 110 over network 150. It may be understood that network 150 may be a cloud-based network. Furthermore, it may be understood that the configuration of network architecture 100 may not be limited to FIG. 1. For example, it may be possible for the various components to be included, excluded, reside inside, or reside outside the illustrated network 150 or server(s) 130.

Database 152 may store, at least temporarily, some of the messages and data associated with one or more conversations hosted by the messaging application (e.g., pictures, videos, and other media files). In some embodiments, database 152 may store, at least temporarily, backup files from the conversations, including threads, messages, videos, and metadata. In addition, database 152 may include encrypted keys that may be distributed to each and all of the messaging group participants.

Client device(s) 110 may include any one of a laptop computer 110-5, a desktop computer 110-3, a mobile device such as a smartphone 110-1, a palm device 110-4, or a tablet device 110-2. In some embodiments, client device(s) 110 may include a headset or other wearable device 110-6 (e.g., a virtual reality headset, augmented reality headset, or smart glass), such that at least one participant may be running an immersive reality messaging application installed therein.

Network 150 may include, for example, any one or more of a local area network (LAN), a wide area network (WAN), the Internet, and the like. Further, network 150 may include, but is not limited to, any one or more of the following network topologies, including a bus network, a star network, a ring network, a mesh network, a star-bus network, tree or hierarchical network, and the like.

Server(s) 130 may include one or more front-end or back-end messaging servers operated by a messaging platform as part of a messaging system. A messaging server may comprise an Internet-accessible server, with network 150 connecting the various devices of the messaging system comprising, at least in part, the Internet. A messaging system may use messaging servers to support messaging for client device(s) 110.

A user may own or operate a client device(s) 110 that may include a smartphone device 110-1 (e.g., an iPhone® device, an Android® device, a Blackberry® device, or any other mobile computing device conforming to a smartphone form). Smartphone device 110-1 may be a cellular device capable of connecting to a network 150 via a cell system using cellular signals. In some embodiments and in some cases, smartphone device 110-1 may additionally or alternatively use Wi-Fi or other networking technologies to connect to the network 150. Smartphone device 110-1 may execute a messaging client, Web browser, or other local application to access the messaging server.

A user may own or operate a client device(s) 110 that may include a tablet device 110-2 (e.g., an iPad® device, an Android® tablet device, a Kindle Fire® device, or any other mobile computing device conforming to a tablet form). Tablet device 110-2 may be a Wi-Fi device capable of connecting to a network 150 via a Wi-Fi access point using Wi-Fi signals. In some embodiments and in some cases, tablet device 110-2 may additionally or alternatively use cellular or other networking technologies to connect to the network 150. Tablet device 110-2 may execute a messaging client, Web browser, or other local application to access the messaging server.

The user may own or operate a client device(s) 110 that may include a personal computer device 110-5 (e.g., a Mac OS® device, Windows® device, Linux® device, or other computer device running another operating system). Personal computer device 110-5 may be an Ethernet device capable of connecting to a network 150 via an Ethernet connection. In some embodiments and in some cases, personal computer device 110-5 may additionally or alternatively use cellular, Wi-Fi, or other networking technologies to connect to the network 150. Personal computer device 110-5 may execute a messaging client, Web browser, or other local application to access the messaging server.

A messaging client may be a dedicated messaging client. A dedicated messaging client may be specifically associated with a messaging provider administering the messaging platform, including messaging servers. A dedicated messaging client may be a general client operative to work with a plurality of different messaging providers including the messaging provider administering the messaging platform including the messaging servers.

The messaging client may be a component of an application (e.g., a messaging application) providing additional functionality. For example, a social networking service may provide a social networking application for use on a mobile device for accessing and using the social networking service. The social networking service may include messaging functionality such as may be provided by messaging servers. It will be appreciated that the messaging servers may be one component of a computing device for the social networking service, with the computing device providing additional functionality of the social networking service. Similarly, the social networking application may provide both messaging functionality and additional social networking functionality.

In some cases, a messaging endpoint may retain state between user sessions and in some cases a messaging endpoint may relinquish state between user sessions. A messaging endpoint may use a local store to retain the current state of a message inbox. This local store may be saved in persistent storage such that the state may be retrieved between one session and the next, including situations in which, for example, a local application is quit or otherwise removed from memory (e.g., 220-1 in FIG. 2) or a device is powered off and on again. Alternatively, a messaging endpoint may use a memory cache to retain the current state of a message inbox but refrain from committing the state of the message inbox to persistent storage.

A messaging endpoint that retains the state of a message inbox may comprise a dedicated messaging application or a messaging utility integrated into another local application, such as a social networking application. A messaging endpoint that relinquishes the state of a message inbox may comprise messaging access implemented within a Web browser. In one embodiment, a Web browser executing on a client device(s) 110, may execute Hypertext Markup Language 5 (HTML5) code that interacts with the messaging server to present messaging functionality to a user.

A user may send and receive messages from a plurality of devices, including smartphone device 110-1, tablet device 110-2, and personal computer device 110-5. The user may use a first messaging application on the smartphone device 110-1, a second messaging application on the tablet device 110-2, and the Web browser on the personal computer device 110-5. The first and second messaging applications may comprise installations of the same application on both devices. The first and second messaging applications may comprise a smartphone-specific and a tablet-specific version of a common application. The first and second messaging application may comprise distinct applications.

The user may benefit from having a message inbox of the user kept consistent across devices of the user. A user may use a smartphone device 110-1 on the cell system while away from home, sending and receiving messages via the cell system. The user may stop by a coffee shop, or other location offering Wi-Fi, and connect a tablet device 110-2 to a Wi-Fi access point. The tablet device may retrieve the existing known state for the message inbox and receive updates that have happened since the last occasion on which tablet device 110-2 had access to a network, including any messages sent by the smartphone device 110-1 and that may have been received by the user while operating smartphone device 110-1. The user may then return home and access the message inbox using a Web browser on a personal computer device 110-5. The Web browser may receive a snapshot of the current state of the message inbox from the messaging servers due to the Web browser not maintaining or otherwise not having access to an existing state for the message inbox. The Web browser may then retrieve incremental updates for any new changes to the state of the message inbox so long as the Web browser maintains a user session with the messaging servers, discarding the known state for the message inbox at the end of the session, such as when the Web browser is closed by the user. Without limitation, an update may correspond to the addition of a message to a mailbox, a deletion of a message from a mailbox, and a read receipt.

A messaging system may operate by defining a messaging inbox as comprising a plurality of messages, wherein each message may be an individual transaction of communication between two or more participants. A mail server may operate by maintaining a message index for the messaging inbox. Mail servers may receive messages and store the messages in mail archives from which messages may be retrieved through reference to the message index. Mail clients may connect to the mail servers and retrieve messages that have been added to the mail archive since the last update. The mail clients may receive a mail index from the mail archive indicating what messages are stored in the mail archive. The mail clients may compare the mail archive to the current inbox to determine what messages are missing, which the mail clients then request from the mail archive. The mail clients may make changes to the inbox, which results in mail inbox instructions being transmitted to the mail archives instructing the mail archives in modifications to make to the representation of the mail inbox on the mail archives.

Messaging interactions (or "chats," or "conversations") mediated by a messaging system may be organized into shared spaces known as message threads. A message thread may collect the messages shared between a particular group of users. Messages sent individually between a pair of users may be collected into a one-on-one message thread uniquely associated with the private messaging between the pair of users. Messages sent between a group of three or more users may not be uniquely defined by the membership of the group, but instead by, in some embodiments, an identifier uniquely identifying the group thread. Membership in a group thread may, in some embodiments, vary over time, adding and/or losing members. Messages in a message thread may be displayed in chronological order by time or date of message posting. Messages in a message thread may be displayed in "question-answer" order, in which one question may be followed by all answers in a hierarchy (e.g., relevance-based hierarchy, popularity-based hierarchy, usefulness-based hierarchy, time-or date-based hierarchy, or the like). Sub-threads may enable a reply to a message to start another thread that remains linked to the original thread.

Messaging interactions may use end-to-end encrypted communication between at least a sending client device (e.g., smartphone device 110-1), one or more back-end messaging servers (e.g., server(s) 130), and a receiving client device (e.g., desktop computer 110-3). A sending client device may encrypt an outgoing message using security techniques that establish one of only the receiving device being able to decrypt the outgoing message (e.g., by using public-key cryptography) or only the sending and receiving devices being able to decrypt the outgoing message (e.g., by using shared-key cryptography). In these embodiments, the server(s) 130 of the messaging system may be prevented from decrypting messages being sent between client device(s) 110. However, in other embodiments, while encrypted communication may be used between client device(s) 110 and the server(s) 130, the server(s) 130 may be empowered to examine the contents of user messages. Such examination may be used to provide services to the users of the messaging system. In some embodiments, users may be empowered to select whether a particular message thread uses end-to-end encryption (and thereby receive the additional privacy of server(s) 130 being prevented from examining the contents of messages) or does not (and thereby receive the benefit of the messaging system being able to programmatically examine messages and offer relevant services to the users).

The messaging system may use knowledge generated from interactions in between users. The messaging system may comprise a component of a social-networking system and may use knowledge generated from the broader interactions of the social-networking system. As such, to protect the privacy of the users of the messaging system and the larger social-networking system, the messaging system may include an authorization server (or other suitable component(s)) that allows users to opt in to or opt out of having the actions of a user logged by the messaging system or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the messaging system and other elements of a social-networking system through blocking, data hashing, anonymization, or other suitable techniques as appropriate.

Figure 2:
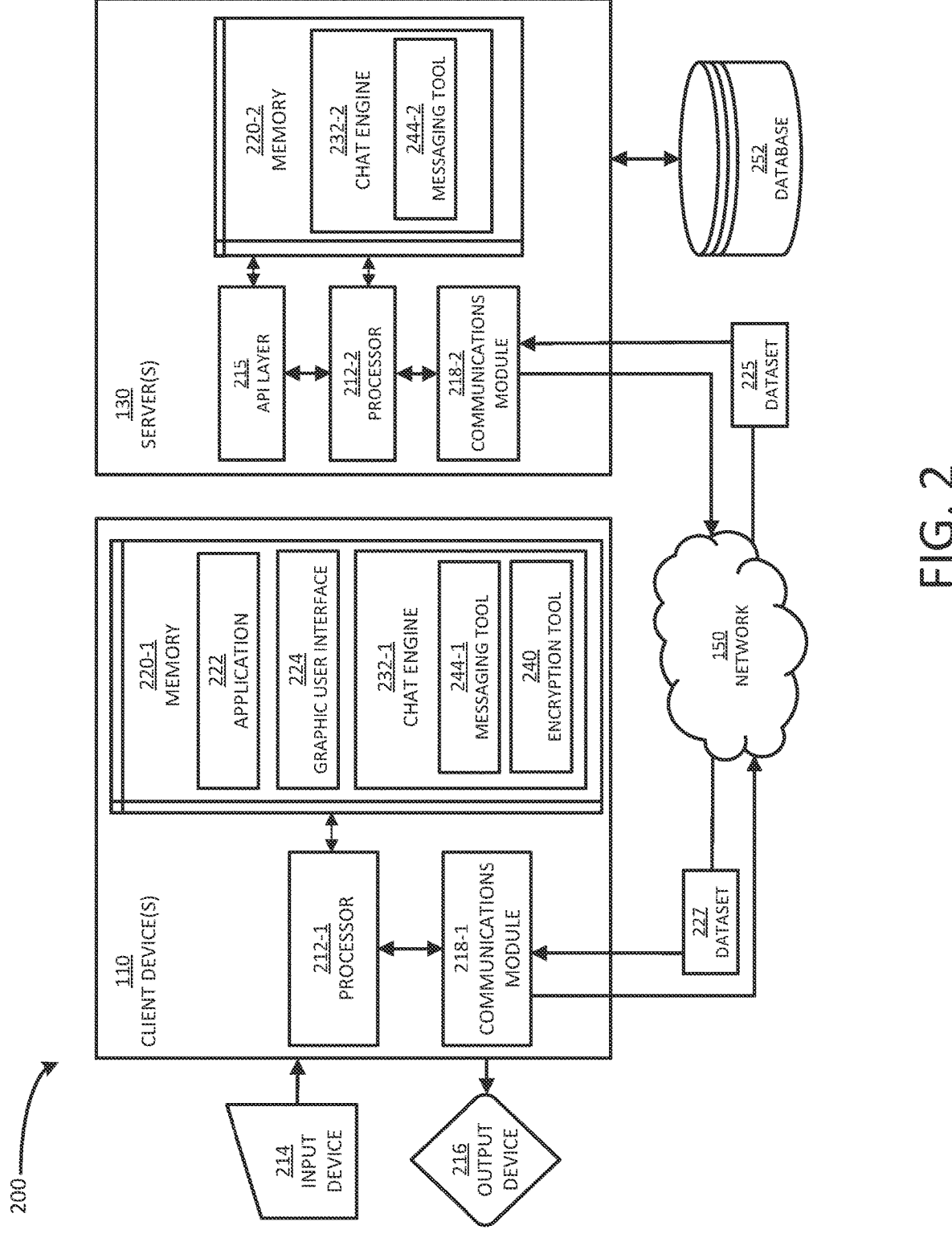
FIG. 2 is a block diagram illustrating details of client device(s) and server(s) used in a network architecture as disclosed herein, according to some embodiments.
Figure 3A:
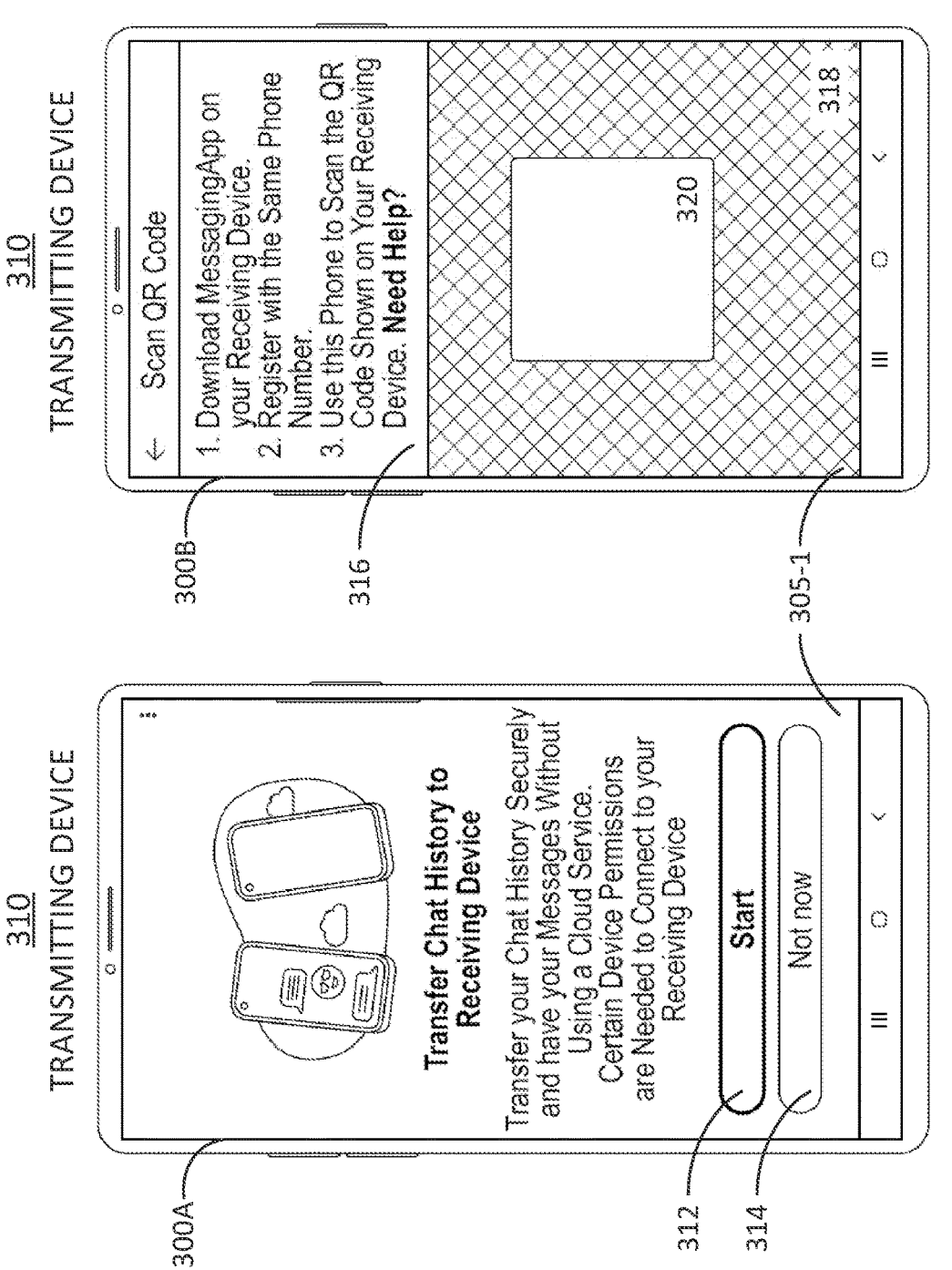
FIGS. 3A to 3F illustrate screenshots of a process for transferring application data of a messaging application from transmitting device to receiving device, according to some embodiments.
Figure 3B:
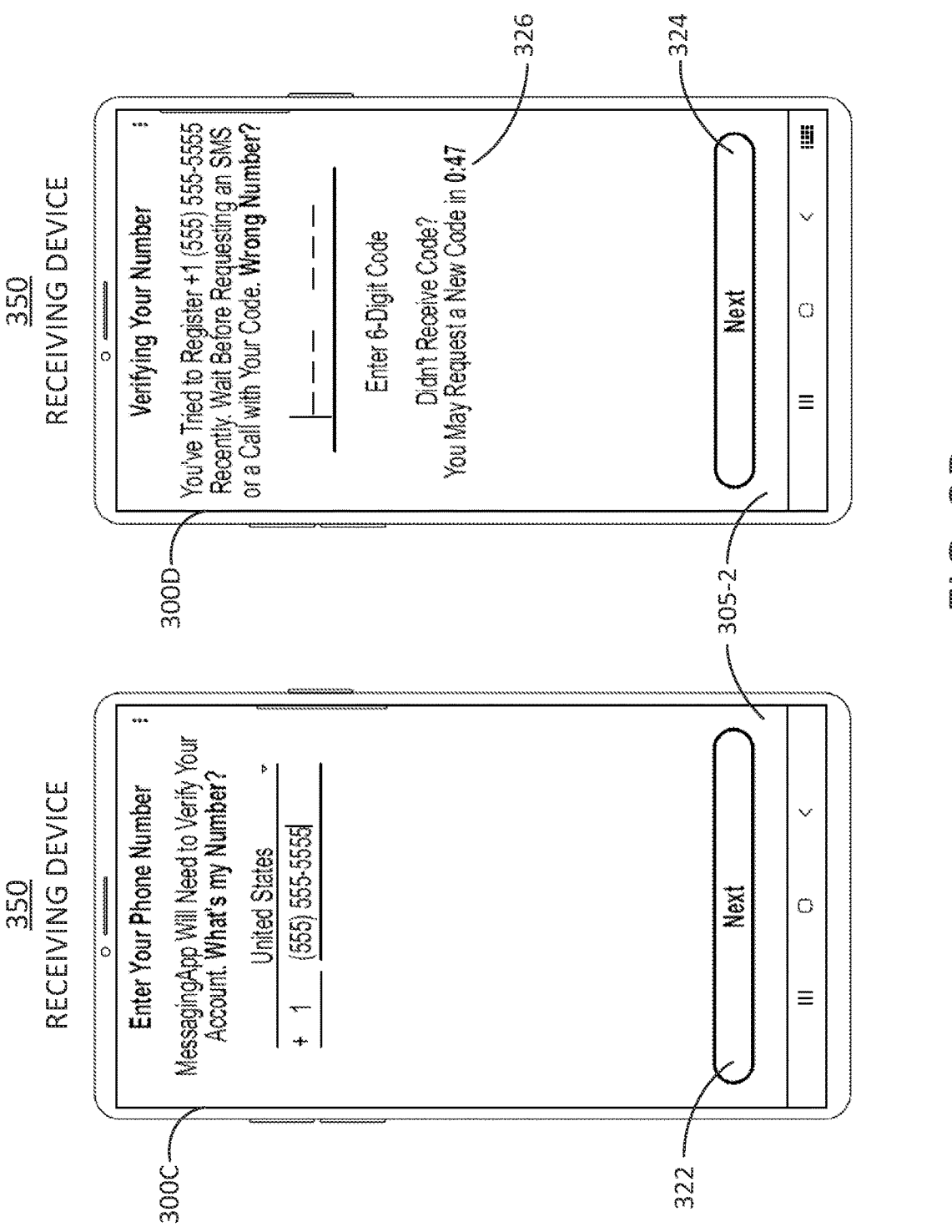
Figure 3C:
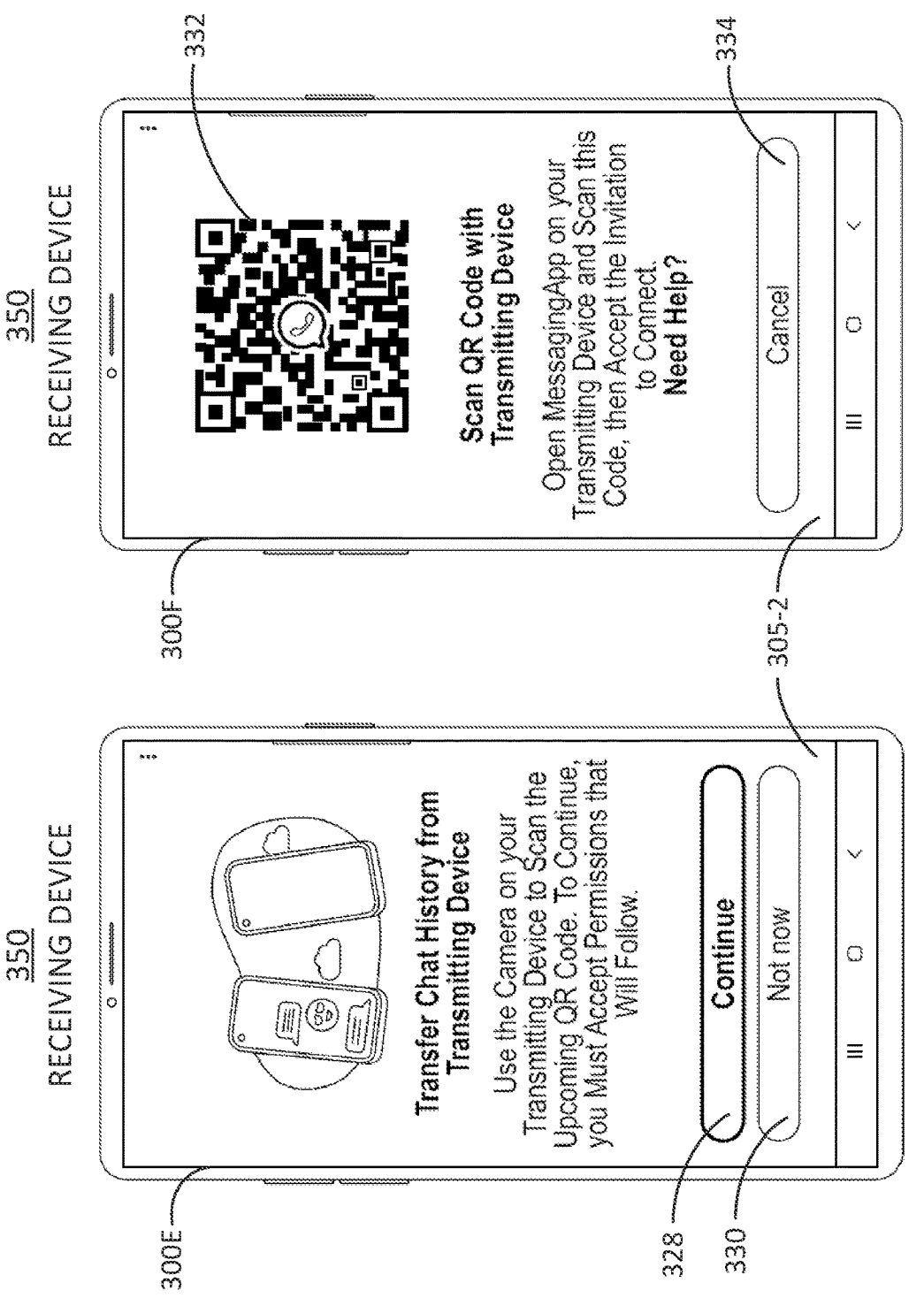
Figure 3D:
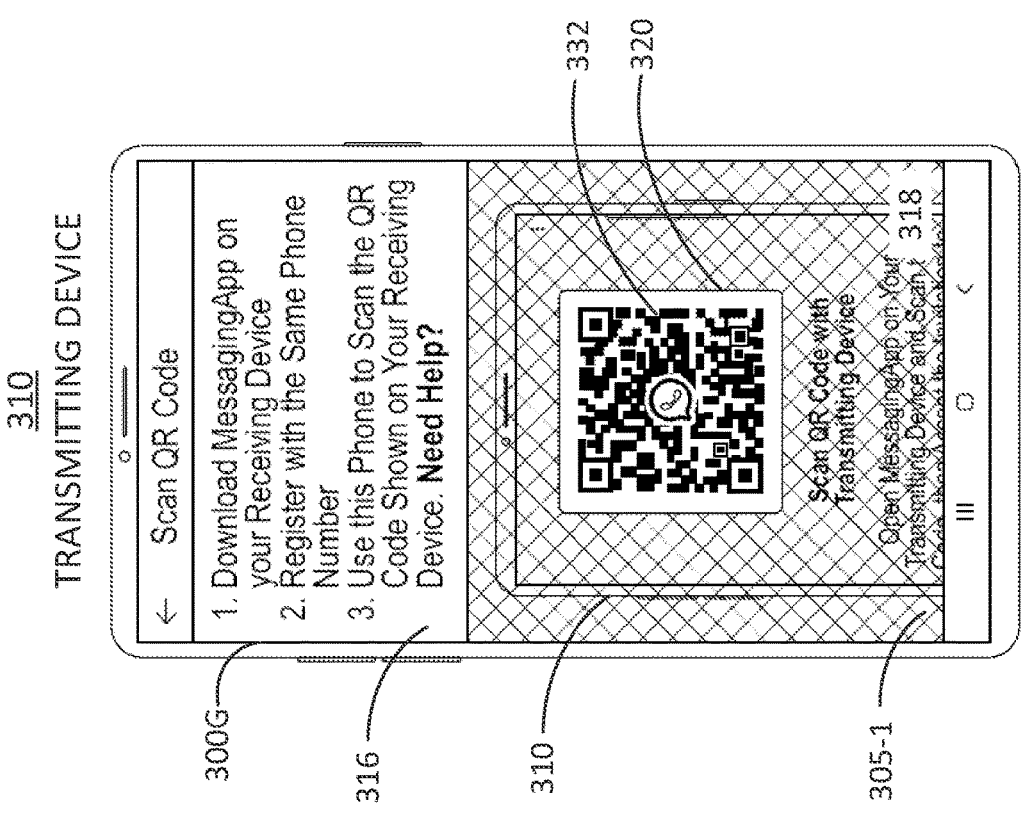
Figure 3E:
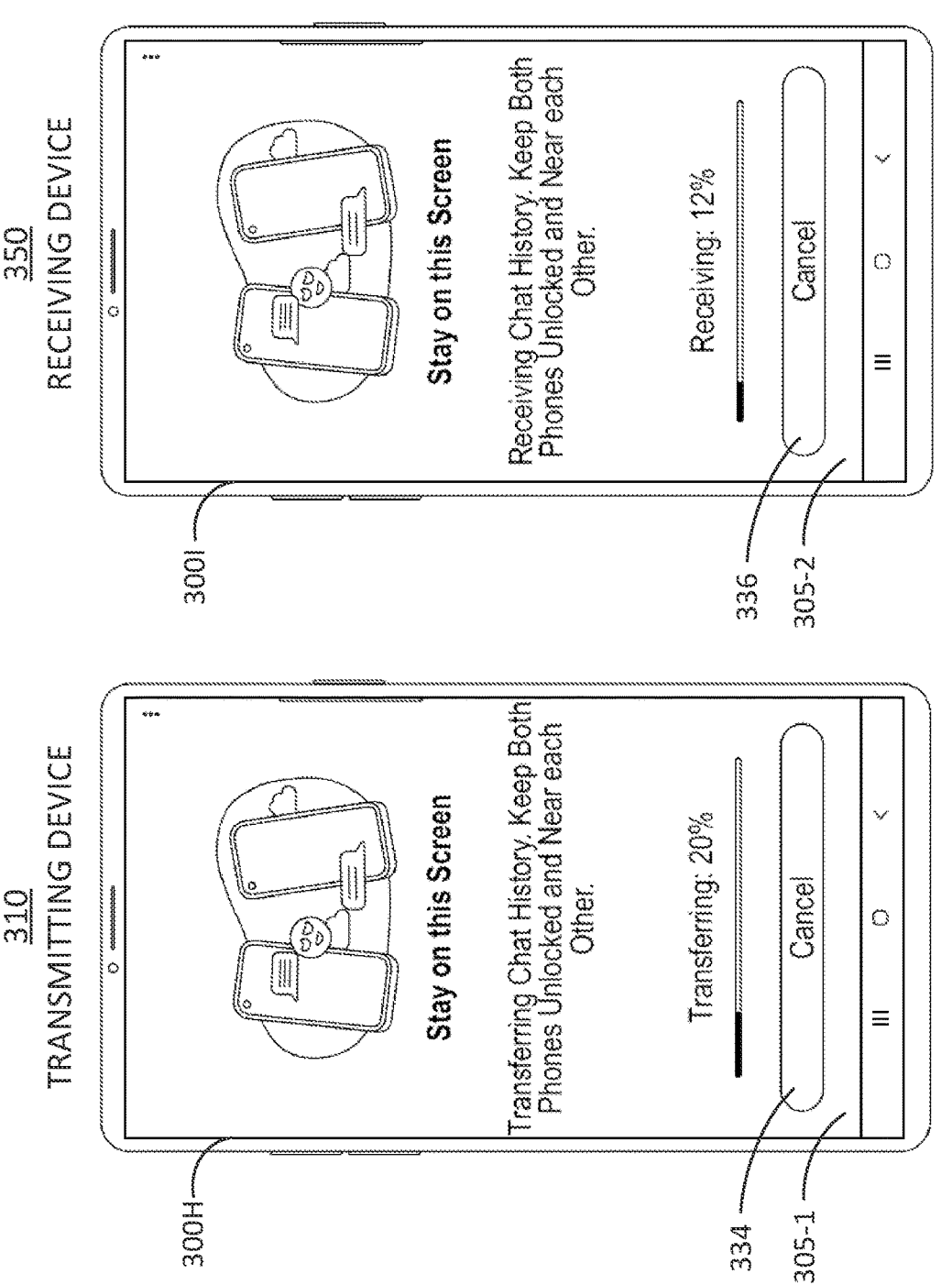
Figure 3F:
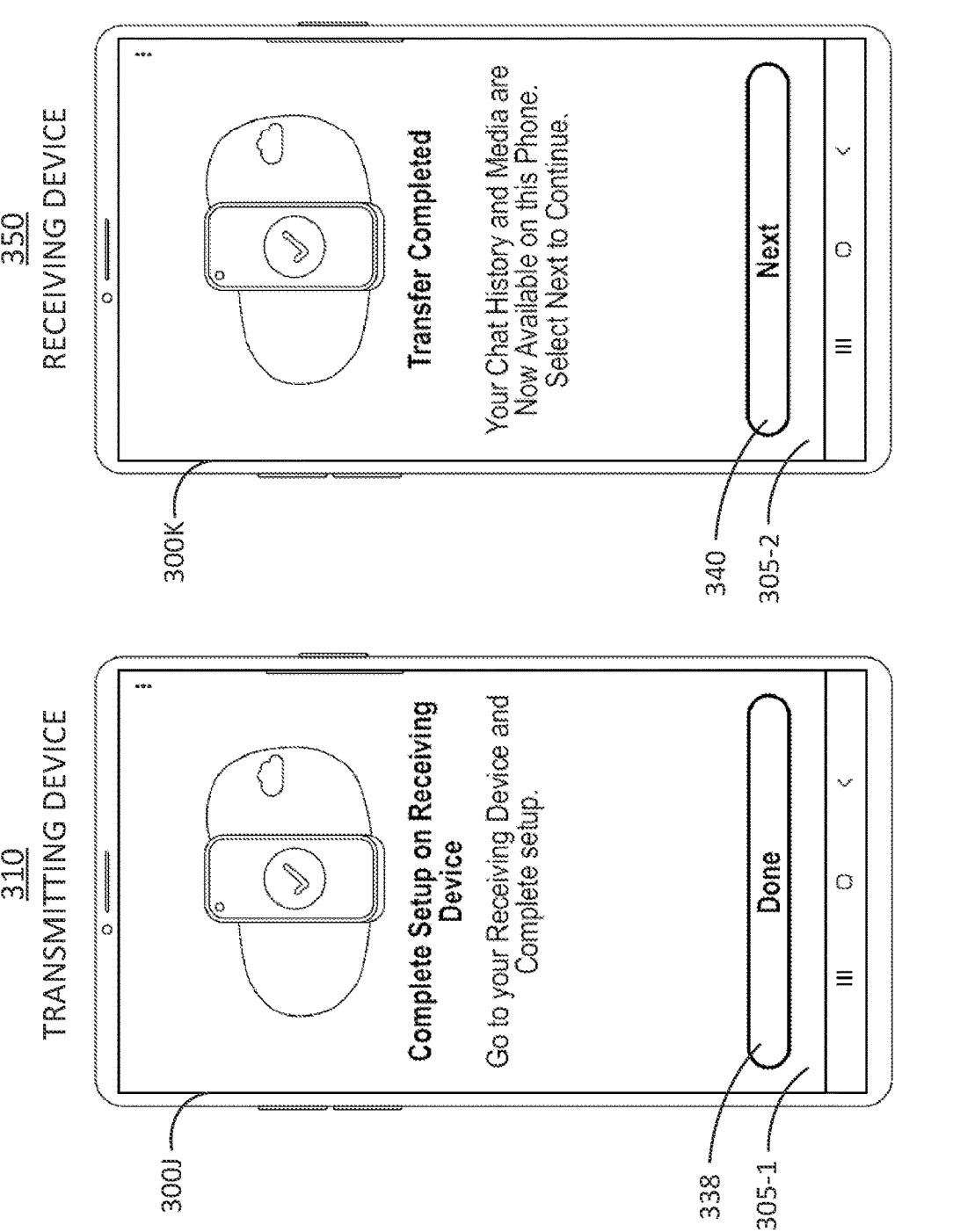

FIG. 2 is a block diagram 200 illustrating details of client device(s) 110 and server(s) 130 used in a network architecture as disclosed herein (e.g., network architecture 100), according to some embodiments. Client device(s) 110 and server(s) 130 may be communicatively coupled over network 150 via respective communications modules 218-1 and 218-2 (hereinafter, collectively referred to as "communications modules 218"). Communications modules 218 may be configured to interface with network 150 to send and receive information, such as requests, responses, messages, and commands to other devices on the network in the form of datasets 225 and 227. Communications modules 218 may be, for example, modems or Ethernet cards. Client device(s) 110 may be coupled with an input device 214 and with an output device 216. Input device 214 may include a keyboard, a mouse, a pointer, a touchscreen, a microphone, a joystick, a virtual joystick, and the like. In some embodiments, input device 214 may include cameras, microphones, and sensors, such as touch sensors, acoustic sensors, inertial motion units (IMU's) and other sensors. For example, in some embodiments, input device 214 may include an eye tracking device to detect the position of a pupil of a user in an artificial reality/virtual reality (AR/VR) headset. Output device 216 may include a display and a speaker with which the customer may retrieve results from client device(s) 110. Client device(s) 110 may also include a processor 212-1, configured to execute instructions stored in a memory 220-1, and to cause client device(s) 110 to perform at least some of the steps in methods consistent with the present disclosure. Memory 220-1 may further include application 222, configured to run in client device(s) 110 and a graphic user interface (GUI) 224 coupled with input device 214 and output device 216. Application 222 may be downloaded by the user from server(s) 130 and may be hosted by server(s) 130. GUI 224 may be instructed by server(s) 130 to display messages, notifications, and other interactive widgets for the user of client device(s) 110. Application 222 may include specific instructions which, when executed by processor 212-1, cause a dataset 227 from server(s) 130 to be displayed for the customer. In some embodiments, application 222 may run on any operating system (OS) installed in client device(s) 110. In some embodiments, application 222 may run out of a Web browser, installed in client device(s) 110.

Dataset 227 may include multiple messages and multimedia files provided by one or more participants in a conversation. A participant using client device(s) 110 may store at least some of the messages and data content in dataset 227 in memory 220-1. In some embodiments, a participant may upload, with client device(s) 110, dataset 225 onto server(s) 130, as part of the conversation. Accordingly, dataset 225 may include a message from the participant, or a multimedia file that the participant wants to share in the conversation.

Database 252 may store data and files associated with a conversation from application 222 (e.g., one or more of datasets 225 and 227).

Server(s) 130 may include an application programming interface (API) layer 215, which controls application 222 in each of client device(s) 110. Server(s) 130 may also include a memory 220-2 storing instructions which, when executed by a processor 212-2, causes server(s) 130 to perform at least partially one or more operations in methods consistent with the present disclosure.

Memory 220-2 may include chat engine 232-2. Chat engine 232-2 may share with, or provide features and resources to, client device(s) 110, including multiple tools associated with application data transfer. The user may access chat engine 232-2 through application 222, installed in memory 220-1 of client device(s) 110. Accordingly, application 222 may be installed by server(s) 130 and perform scripts and other routines provided by server(s) 130 through any one of multiple tools via an application programming interface (API) layer 215. Execution of application 222 may be controlled by processor 212-1.

Chat engine 232-1 may include messaging tool 244-1. Messaging tool 244-1 may be configured to collect datasets sent by client device(s) 110 during a conversation or other data transfer and provide a feed with the datasets to all client device(s) 110 for participants in a conversation or data transfer. Chat engine 232-2 may include messaging tool 244-2. Messaging tool 244-2 may be configured to collect messages from dataset 225 sent by client device(s) 110 during a conversation or other data transfer and provide a feed with a dataset 227 to all client device(s) 110 for participants in a conversation or data transfer. Datasets 225 and 227 may include text messages (including the name of the participant sending the message, and the time), pictures, one-time-view pictures, videos, and other content (e.g., reactions to messages, such as emojis, likes, and others) communicated between client device(s) 110, between server(s) 130, or between client device(s) 110 and server(s) 130. Encryption tool 240 may encrypt or decrypt a dataset to ensure the privacy and security of a user. In some embodiments, the information in dataset 225 and dataset 227 may be encrypted such that chat engine 232-2 does not have access to it, and simply transfers data packets between client device(s) 110.

Processors 212-1 and 212-2, and memories 220-1 and 220-2 will be collectively referred to, hereinafter, as "processors 212" and "memories 220," respectively.

FIGS. 3A to 3F illustrate screenshots 300A, 300B, 300C, 300D, 300E, 300F, 300G, 300H, 300I, 300J, and 300K (hereinafter, collectively referred to as "screenshots 300") of a process for transferring application data of messaging application 305 from transmitting device 310 to receiving device 350, according to some embodiments. Screenshots 300 include interactive elements and non-interactive elements, including fields, bubbles, buttons, and windows for entering information or providing information. In some embodiments, transmitting device 310 and receiving device 350 are associated with the same user account of messaging application 305. In some embodiments, messaging application 305 may display a vertical ellipsis character (or similar character or icon) that may be clicked, selected, or tapped to expand or open for display of additional options or information.

In screenshot 300A, messaging application client 305-1 (e.g., MessagingApp) displays in a graphical user interface of transmitting device 310 a "Transfer Chat History to Receiving Device" page with prompts for a user to begin transferring messaging application data (e.g., chat history or media files) from transmitting device 310 to receiving device 350. In some embodiments, transmitting device 310 may be registered with a server of messaging application client 305-1 to associate transmitting device 310 with a user account. To create a user account, messaging application client 305-1 may require a unique user attribute (e.g., a valid mobile phone number). While logged into messaging application client 305-1, the "Transfer Chat History to Receiving Device" page may be navigated to. On the "Transfer Chat History to Receiving Device" page, messaging application client 305-1 may display a prompt that device permissions may be required to connect transmitting device 310 to receiving device 350. To start the transfer process, "Start" button 312 may be clicked, selected, or tapped. To decline the transfer process, "Not now" button 314 may be clicked, selected, or tapped. In some embodiments, device permissions may be requested by messaging application client 305-1 on transmitting device 310 or by messaging application client 305-2 on receiving device 350 (see FIG. 3B). Device permissions may include location permissions, camera permissions, microphone permissions, contacts list permissions, call log permissions, calendar permissions, or the like.

In screenshot 300B, messaging application client 305-1 displays in a graphical user interface of transmitting device 310 a "Scan QR Code" page with an instructions section 316 and a camera preview window 318. In some embodiments, the instructions may include: (1) "Download MessagingApp on your Receiving Device"; (2) "Register with the Same Phone Number"; and (3) "Use this Phone to Scan the QR Code Shown on Your Receiving Device." The phone number may be the phone number used to register transmitting device 310 with a messaging application server. Camera preview window 318 may include focus window 320 for capturing an image of a context code (e.g., quick response (QR) code) displayed in the graphical user interface of receiving device 350. In some embodiments, interactive text element "Need Help?" may be clicked, selected, or tapped to open a separate in-application page or an external webpage associated with messaging application 305. The separate in-application page or external webpage may provide additional information about the instructions displayed in instructions section 316.

In screenshot 300C, messaging application client 305-2 displays in a graphical user interface of receiving device 350 an "Enter Your Phone Number" page as part of the process to register receiving device 350 with a server of messaging application 305. A country name associated with the phone number (e.g., United States) may be selected from a drop-down menu, and the telephone number (e.g., +1 555-555-5555) may be entered into the appropriate field using, for example, text input or voice input. Messaging application client 305-2 may display a prompt that the user account must be verified (e.g., by using the telephone number). In some embodiments, interactive text element "What's my Number?" may be clicked, selected, or tapped to open a separate in-application page or an external application page that provides the phone number of receiving device 350. "Next" button 322 may be clicked, selected, or tapped to proceed with the transfer after the country name and phone number have been entered.

In screenshot 300D, messaging application client 305-2 displays in a graphical user interface of receiving device 350 a "Verifying Your Number" page. In some embodiments, a server of the messaging application may generate a one-time password (OTP) (e.g., a six-digit numerical code) to be provided (e.g., by short message service (SMS) or by phone call) to the phone number entered to register receiving device 350 (e.g., +1 555-555-5555). Messaging application client 305-2 may display a prompt for a user to wait a predetermined amount of time (e.g., as indicated by countdown timer 326, which reads "0:47" in FIG. 3B) before requesting a new OTP. A new OTP may be requested by returning to the "Enter Your Phone Number" page and re-entering the country name/phone number and by clicking, selecting, or tapping "Next" button 322, or by clicking, selecting, or tapping an interactive element on the "Verifying Your Number" page (e.g., interactive text element "Request a New Code"). After the OTP has been entered into the appropriate field (e.g., automatically, or by text input or voice input), "Next" button 324 may be selected to proceed with the transfer.

In screenshot 300E, messaging application client 305-2 displays in a graphical user interface of receiving device 350 a "Transfer Chat History from Transmitting Device" page with prompts for a user to begin transferring messaging application data (e.g., chat history or media files) from transmitting device 310 to receiving device 350. Messaging application client 305-2 may display a prompt to use a camera on transmitting device 310 to scan the context code (e.g., QR code) that may be displayed on a subsequent page on receiving device 350. To continue the transfer process, "Continue" button 328 may be clicked, selected, or tapped. To decline the transfer process, "Not now" button 330 may be clicked, selected, or tapped. In some embodiments, device permissions may be requested by messaging application client 305-1 on transmitting device 310 or by messaging application client 305-2 on receiving device 350. Device permissions may include location permissions, camera permissions, microphone permissions, contacts list permissions, call log permissions, calendar permissions, or the like. In some embodiments, clicking, selecting, or tapping "Continue" button 328 may open a pop-up window that requests permission to allow messaging application client 305-2 to find, connect to, and determine the relative position of nearby devices. The pop-up window may include buttons that may be clicked, selected, or tapped to indicate permission is granted (e.g., "Allow" button) or permission is denied (e.g., "Don't allow" button).

In screenshot 300F, messaging application client 305-2 displays in a graphical user interface of receiving device 350 a "Scan QR Code with Transmitting Device" page. The page displays prompts for opening messaging application client 305-1 on transmitting device 310, scanning a context code (e.g., QR code 332) displayed in screenshot 300F, and accepting on transmitting device 310 an invitation to connect with receiving device 350. In some embodiments, interactive text element "Need Help?" may be clicked, selected, or tapped to open a separate in-application page or an external webpage associated with the messaging application. The separate in-application page or external webpage may provide additional information about the "Scan QR Code with Transmitting Device" page (e.g., how to properly scan the context code). To decline to proceed with the transfer, "Cancel" button 334 may be clicked, selected, or tapped.

In screenshot 300G, messaging application client 305-1 displays in a graphical user interface of transmitting device 310 the "Scan QR Code" page from screenshot 300B, which includes an instructions section 316 and a camera preview window 318. In screenshot 300G, an image of receiving device 350 is captured in camera preview window 318, which includes an image of QR code 332 captured in focus window 320. In some embodiments, an external camera application of transmitting device 310 may be used to capture a context code from receiving device 350.

In screenshot 300H, messaging application client 305-1 displays in a graphical user interface of transmitting device 310 a "Transferring Chat History" page. Messaging application client 305-1 displays a progress bar and a percentage figure to indicate how much of the data has been transferred by transmitting device 310. In some embodiments, transfer progress may be indicated by a field displaying an approximate time remaining until the transfer is complete. Messaging application client 305-1 displays a prompt to stay on the current screen, with messaging application client 305-1 open, and to keep both transmitting device 310 and receiving device 350 unlocked and near each other while the transfer is ongoing. In some embodiments, application data may not be deleted from transmitting device 310 as the application data is transferred. In some embodiments, clicking, selecting, or tapping "Cancel" button 334 may cancel the transfer. In some embodiments, if a transfer is canceled while the transfer is in progress (e.g., by clicking, selecting, or tapping "Cancel" button 334), the application data may remain available on transmitting device 310 and the application data may be unavailable on receiving device 350.

In screenshot 300I, messaging application client 305-2 displays in a graphical user interface of receiving device 350 a "Receiving Chat History" page. Messaging application client 305-2 displays a progress bar and a percentage figure to indicate how much of the data has been received by receiving device 350. In some embodiments, transfer progress may be indicated by a field displaying an approximate time remaining until the transfer is complete. Messaging application client 305-2 displays a prompt to stay on the current screen, with messaging application client 305-2 open, and to keep both transmitting device 310 and receiving device 350 unlocked and near each other while the transfer is ongoing. In some embodiments, application data may not be deleted from transmitting device 310 as the application data is transferred. In some embodiments, clicking, selecting, or tapping "Cancel" button 336 may cancel the transfer. In some embodiments, if a transfer is canceled while the transfer is in progress (e.g., by clicking, selecting, or tapping "Cancel" button 334), the application data may remain available on transmitting device 310 and the application data may be unavailable on receiving device 350.

In screenshot 300J, messaging application client 305-1 displays in a graphical user interface of transmitting device 310 a "Complete Setup on Receiving Device" page with a checkmark icon to indicate the transfer from transmitting device 310 is complete. Messaging application client 305-1 displays a prompt to complete the setup of messaging application client 305-2 on receiving device 350. In some embodiments, once the setup of messaging application client 305-2 on receiving device 350 is complete, transmitting device 310 may be unregistered with messaging application 305 and the messaging application data may become unavailable on transmitting device 310. In some embodiments, clicking, selecting, or tapping "Done" button 338 may exit the data transfer user interface.

In screenshot 300K, messaging application client 305-2 displays in a graphical user interface of receiving device 350 a "Transfer Completed" page with a checkmark icon to indicate the transfer to receiving device 350 is complete. Messaging application client 305-2 displays a prompt that the chat history and media files are available on receiving device 350. In some embodiments, once the setup of messaging application client 305-2 on receiving device 350 is complete, transmitting device 310 may be unregistered with messaging application 305 and the messaging application data may become unavailable on transmitting device 310. In some embodiments, clicking, selecting, or tapping "Next" button 340 may exit the data transfer user interface and open one or more pop-up windows for completing the setup of messaging application 305 on transmitting device 310. In some embodiments, one or more pop-up windows may request permission for messaging application 305 to access contacts, photos, video, or other media (e.g., music and audio). In some embodiments, completing the setup of messaging application 305 on transmitting device 310 may include granting permission for a requested access.

In some embodiments, opening on transmitting device 310 the first page of a data transfer user interface of messaging application 305 (e.g., "Transfer Chat History from Transmitting Device" page (see screenshot 300A)) may trigger transmitting device 310 to advertise on a network to which transmitting device 310 is connected (e.g., a client-server network or a peer-to-peer network) a data transfer service of messaging application 305. In some embodiments, opening on receiving device 350 the first page of a data transfer user interface of messaging application 305 (e.g., "Transfer Chat History from Transmitting Device" page (see screenshot 300E)) may trigger receiving device 350 to browse a network to which transmitting device 310 is connected (e.g., a client-server network or a peer-to-peer network) for a data transfer service of messaging application 305 advertised on the network. Upon receiving device 350 finding transmitting device 310 on a network, receiving device 350 or transmitting device 310 may attempt to initiate a connection according to a peer-to-peer communication protocol (e.g., Wi-Fi Direct, Apple® Wireless Direct Link (AWDL)), using a cryptographic communication protocol (e.g., Transport Layer Security (TLS)) to secure the peer-to-peer connection. The cryptographic communication protocol may require transmitting device 310 and receiving device 350 to complete a handshake to authenticate each other, agree on encryption standards, or establish a secure channel for data transfer.

In some embodiments, receiving device 350 may generate a context code (e.g., QR code 332) for display in a graphical user interface of receiving device 350. The context code may include at least one of a hash of a self-signed certificate of receiving device 350, a random cryptographic key generated by receiving device 350, and an authentication token generated by receiving device 350. In some embodiments, a hash function used to generate the hash of the self-signed certificate of receiving device 350 may generate a 224-bit, 256-bit, 384-bit, or 516-bit hash value. Transmitting device 310 may scan the context code using a camera of transmitting device 310.

In some embodiments, transmitting device 310 may verify the authenticity (e.g., the identity) of receiving device 350 (e.g., may verify receiving device 350 is associated with the same user account of messaging application 305 that transmitting device 310 is associated with, or may determine whether receiving device 350 is authorized to receive a data transfer from transmitting device 310) by determining during a handshake with receiving device 350 whether a hash of a self-signed certificate of receiving device 350 corresponding to the context code generated by receiving device 350 matches a hash of a second self-signed certificate provided by the receiving device 350 during the handshake. If the hashes match, then a secure connection (e.g., a peer-to-peer connection secured by a cryptographic protocol) may be established and the data transfer may begin. If the hashes do not match, then a connection may not be established, and the data transfer may not begin.

In some embodiments, transmitting device 310 may verify the authenticity (e.g., the identity) of receiving device 350 (e.g., may verify receiving device 350 is associated with the same user account of messaging application 305 that transmitting device 310 is associated with, or may determine whether receiving device 350 is authorized to receive a data transfer from transmitting device 310) by determining during a handshake with receiving device 350 whether a random cryptographic key generated by receiving device 350, and corresponding to the context code generated by receiving device 350, matches a random cryptographic key generated by receiving device 350 and provided by receiving device 350 during the handshake. If the random cryptographic keys match, then a secure connection (e.g., a peer-to-peer connection secured by a cryptographic protocol) may be established and the data transfer may begin. If the random cryptographic keys do not match, then a connection may not be established, and the data transfer may not begin.

In some embodiments, once a secure connection is established, transmitting device 310 may, at the start of the connection, pass to receiving device 350 (e.g., as a password or as an authentication header) an authentication token included in a context code (e.g., QR code 332) generated by receiving device 350 and scanned by transmitting device 310. Receiving device 350 may verify the authenticity (e.g., the identity) of transmitting device 310 (e.g., may verify transmitting device 310 is associated with the same user account of messaging application 305 that receiving device 350 is associated with, or may determine whether transmitting device 310 is authorized to transfer data to receiving device 350) by determining whether the authentication token passed by transmitting device 310 to receiving device 350 matches an authentication token generated by receiving device 350 and included by receiving device 350 in the context code. If the authentication tokens match, then the secure connection (e.g., a peer-to-peer connection secured by a cryptographic protocol) may be maintained and the data transfer may continue. If the authentication tokens do not match, then the secure connection may be terminated, and the data transfer may not continue.

In some embodiments, once a secure connection is established, all data transferred over the connection may be end-to-end encrypted. A server associated with messaging application 305 may generate a cryptographic key associated with a user account of the application. The server may generate the cryptographic key using salt associated with the server ("server salt") or a hash of the user account name or identification ("account hash"). Transmitting device 310 may request the cryptographic key from the server. Transmitting device 310 may encrypt each application data file using the cryptographic key, and transmitting device 310 may store an initialization vector for each file, along with the account hash and the server salt, in a metadata file. Transmitting device 310 may transfer the metadata file to receiving device 350. Receiving device 350 may request the cryptographic key from the server by submitting to the server the account hash and the server salt. If the server verifies the account hash and the server salt submitted by receiving device 350 match the account hash and the server salt generated by the server, then the server may provide the cryptographic key to receiving device 350. Receiving device 350 may use the metadata file and the cryptographic key to decrypt each encrypted data file sent by transmitting device 310 to receiving device 350. Once the transfer is complete, transmitting device 310 or receiving device 350 may close the secure connection.

FIG. 4 is a flowchart illustrating steps in a method 400 for transferring messaging application data from a transmitting device (e.g., transmitting device 310) to a receiving device (e.g., receiving device 350), according to some embodiments. In some embodiments, at least one or more of the steps in method 400 may be performed by a processor executing instructions stored in a memory of a client device or server communicatively coupled with one another through a network via communications modules, as disclosed herein (e.g., processors 212, memories 220, client device(s) 110, server(s) 130, databases 152 and 252, communications modules 218, and network 150). The memories may include instructions in a messaging application and mechanisms such as a chat engine, including an encryption tool and a messaging tool, as disclosed herein (e.g., application 222, chat engine 232-1, chat engine 232-2, encryption tool 240, messaging tool 244-1, and messaging tool 244-2). Methods consistent with the present disclosure may include at least one or more of the steps in method 400 performed in a different order, simultaneously, quasi-simultaneously, or overlapping in time.

Step 402 includes capturing, at a transmitting device hosting a messaging application, a context code generated for display in a graphical user interface of a receiving device hosting the messaging application. In some embodiments of Step 402, the transmitting device and the receiving device may be associated with a same user account of the messaging application. In some embodiments of Step 402, capturing the context code may include scanning the context code using a camera of the transmitting device. In some embodiments of Step 402, the context code may be a quick response (QR) code. In some embodiments of Step 402, the context code may include a hash of a self-signed certificate of the receiving device or a random cryptographic key generated by the receiving device.

Step 404 includes determining, based on the context code, the receiving device is authorized to receive from the transmitting device a dataset associated with a user account of the messaging application. In some embodiments, Step 404 may further include conducting a handshake with the receiving device according to a cryptographic communication protocol. In such embodiments, determining the receiving device is authorized to receive the dataset may include the following: determining a first hash of a first self-signed certificate corresponding to the context code generated by the receiving device matches a second hash of a second self-signed certificate provided by the receiving device during the handshake; or, determining a first random cryptographic key generated by the receiving device and corresponding to the context code generated by the receiving device matches a second random cryptographic key generated by the receiving device and provided by the receiving device during the handshake. In some embodiments of Step 404, the dataset may include a messaging history and a media history associated with the user account of the messaging application.

Step 406 includes establishing, based on determining the receiving device is authorized, a peer-to-peer connection between the transmitting device and the receiving device.

Step 408 includes transferring, by the peer-to-peer connection, a dataset and metadata associated with the dataset from the transmitting device to the receiving device. In some embodiments, Step 408 may further include receiving, from a server associated with the messaging application, a cryptographic key generated by the server and associated with a user account. In some embodiments, Step 408 may further include encrypting the dataset for a transfer of the dataset from the transmitting device to the receiving device, wherein the dataset is encrypted using the cryptographic key. In some embodiments of Step 408, the metadata may include a hash associated with the user account and random data used by the server to generate the hash.

Hardware Overview

Figure 5:
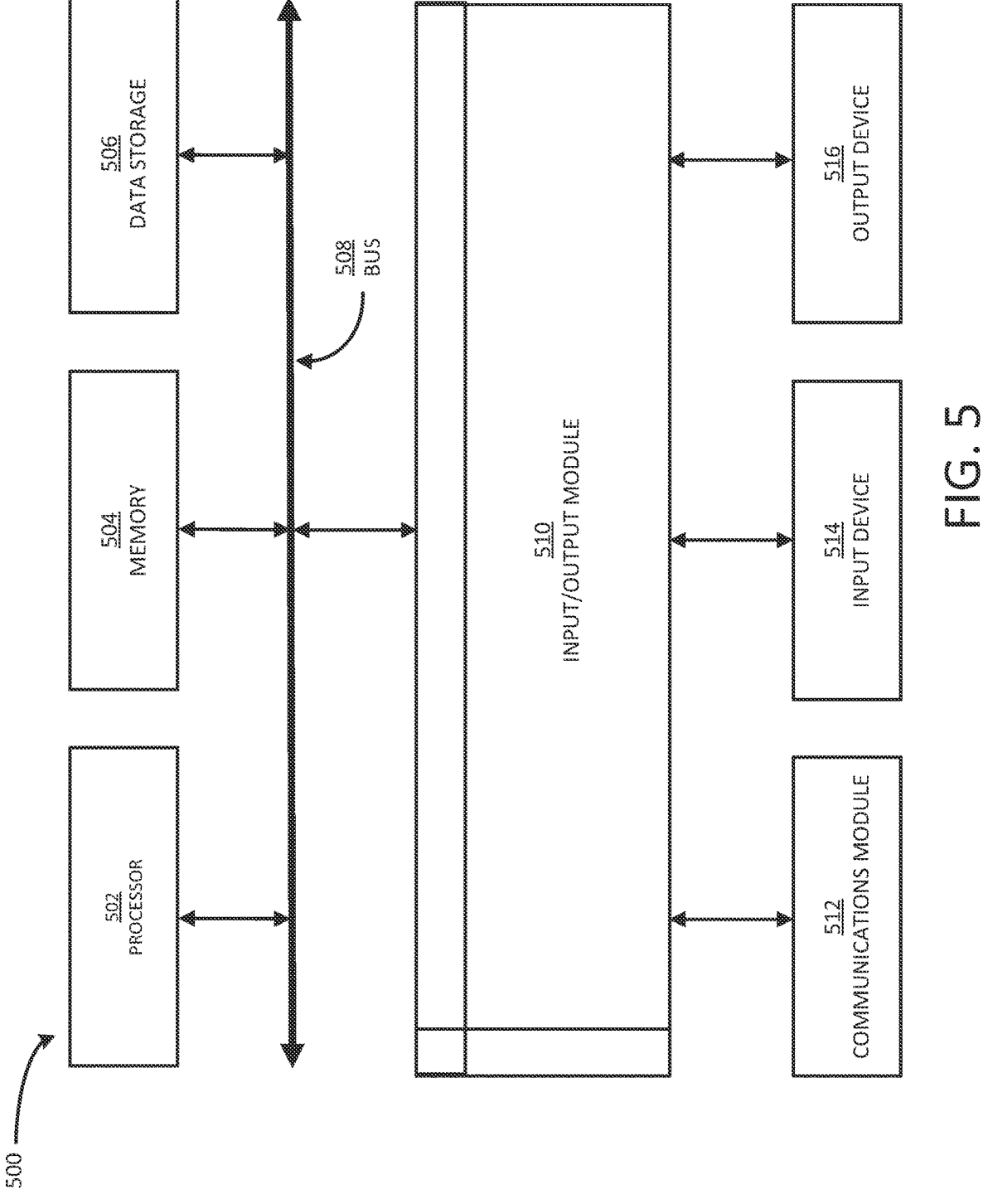
FIG. 5 is a block diagram illustrating an exemplary computer system with which mobile phones and other client devices, and the method in FIG. 4, may be implemented, according to some embodiments.

FIG. 5 is a block diagram illustrating an exemplary computer system 500 with which mobile phones and other client devices, and the method in FIG. 4, may be implemented, according to some embodiments. In certain aspects, the computer system 500 may be implemented using hardware or a combination of software and hardware, either in a dedicated server, or integrated into another entity, or distributed across multiple entities.

Computer system 500 (e.g., client device(s) 110 and server(s) 130) includes a bus 508 or other communication mechanism for communicating information, and a processor 502 (e.g., processors 212) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that may perform calculations or other manipulations of information.

Computer system 500 may include, in addition to hardware, code that creates an execution environment for the computer program in question, e.g., code that constitutes processor firmware, a protocol stack, a database management system, an operating system, or a combination of one or more of them stored in an included memory 504 (e.g., memories 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 may be supplemented by, or incorporated in, special purpose logic circuitry.

The instructions may be stored in the memory 504 and implemented in one or more computer program products, e.g., one or more modules of computer program instructions encoded on a computer-readable medium for execution by, or to control the operation of, the computer system 500, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one computer or on multiple computers that may be located at one site or distributed across multiple sites and interconnected by a communication network. The processes and logic flows described in this specification may be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. Input/output module 510 may be any input/output module. Exemplary input/output modules 510 include data ports such as Universal Serial Bus (USB) ports. The input/output module 510 may be configured to connect to a communications module 512. Exemplary communications modules 512 (e.g., communications modules 218) include networking interface cards, such as Ethernet cards and modems. In certain aspects, input/output module 510 may be configured to connect to a plurality of devices, such as an input device 514 (e.g., input device 214) and/or an output device 516 (e.g., output device 216). Exemplary input devices 514 include a keyboard and a pointing device, e.g., a mouse or a trackball, by which a user may provide input to the computer system 500. Other kinds of input devices 514 may be used to provide for interaction with a user as well, such as a tactile input device, visual input device, audio input device, or brain-computer interface device. For example, feedback provided to the user may be any form of sensory feedback, e.g., visual feedback, auditory feedback, or tactile feedback; and input from the user may be received in any form, including acoustic, speech, tactile, or brain wave input. Exemplary output devices 516 include display devices, such as an LCD (liquid crystal display) monitor, for displaying information to the user.

According to one aspect of the present disclosure, the client device(s) 110 and server(s) 130 may be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification may be implemented in a computing system that includes a back-end component, e.g., a data server, or that includes a middleware component, e.g., an application server, or that includes a front-end component, e.g., a client computer having a graphical user interface or a Web browser through which a user may interact with an implementation of the subject matter described in this specification, or any combination of one or more such back-end, middleware, or front-end components. The components of the system may be interconnected by any form or medium of digital data communication, e.g., a communication network. The communication network (e.g., network 150) may include, for example, any one or more of a LAN, a WAN, the Internet, and the like. Further, the communication network may include, but is not limited to, for example, any one or more of the following tool topologies, including a bus network, a star network, a ring network, a mesh network, a star-bus network, tree or hierarchical network, or the like. The communications modules may be, for example, modems or Ethernet cards.

Computer system 500 may include clients and servers. A client and server may be generally remote from each other and typically interact through a communication network. The relationship of client and server arises by virtue of computer programs running on the respective computers and having a client-server relationship to each other. Computer system 500 may be, for example, and without limitation, a desktop computer, laptop computer, or tablet computer. Computer system 500 may also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires forming bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer may read. The machine-readable storage medium may be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

General Notes on Terminology

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

The subject matter of this specification has been described in terms of particular aspects, but other aspects may be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims may be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems may generally be integrated together in a single software product or packaged into multiple software products. Other variations are within the scope of the following claims.

What is claimed is:

1. A computer-implemented method, comprising:

capturing, at a first client device hosting a messaging application, a context code generated for display in a graphical user interface of a second client device hosting the messaging application;

determining, based on the context code, the second client device is authorized to receive from the first client device a dataset associated with a user account of the messaging application;

establishing, based on determining the second client device is authorized, a peer to-peer connection between the first client device and the second client device; and transferring, by the peer-to-peer connection, (i) the dataset, and (ii) metadata associated with the dataset from the first client device to the second client device, wherein the metadata includes (i) a hash associated with the user account and (ii) random data used by the server to generate the hash, wherein the random data is a salt associated with the server.

2. The computer-implemented method of claim 1, wherein the first client device and the second client device are associated with the user account of the messaging application.

3. The computer-implemented method of claim 1, wherein capturing the context code comprises scanning the context code using a camera of the first client device.

4. The computer-implemented method of claim 1, wherein the context code is a quick response (QR) code.

5. The computer-implemented method of claim 1, wherein the context code includes a hash of a self-signed certificate of the second client device or a random cryptographic key generated by the second client device.

6. The computer-implemented method of claim 1, further comprising conducting a handshake with the second client device according to a cryptographic communication protocol.

7. The computer-implemented method of claim 6, wherein determining the second client device is authorized to receive the dataset comprises:

determining a first hash of a first self-signed certificate corresponding to the context code generated by the second client device matches a second hash of a second self-signed certificate provided by the second client device during the handshake; or determining a first random cryptographic key generated by the second client device and corresponding to the context code generated by the second client device matches a second random cryptographic key generated by the second client device and provided by the second client device during the handshake.

8. The computer-implemented method of claim 1, wherein the dataset includes a messaging history and a media history associated with the user account of the messaging application.

9. The computer-implemented method of claim 1, further comprising:

receiving, from a server associated with the messaging application, a cryptographic key generated by the server and associated with the user account; and encrypting the dataset for a transfer of the dataset from the first client device to the second client device, wherein the dataset is encrypted using the cryptographic key.

22

10. A system, comprising:

one or more processors; and a memory storing instructions which, when executed by the one or more processors, cause the system to:

capture, at a first client device hosting a messaging application, a context code generated for display in a graphical user interface of a second client device hosting the messaging application;

determine, based on the context code, the second client device is authorized to receive from the first client device a dataset associated with a user account of the messaging application;

establish, based on determining the second client device is authorized, a peer-to-peer connection between the first client device and the second client device; and transfer, by the peer-to-peer connection, (i) the dataset, and (ii) metadata associated with the dataset from the first client device to the second client device, wherein the metadata includes (i) a hash associated with the user account and (ii) random data used by the server to generate the hash, wherein the random data is a salt associated with the server.

11. The system of claim 10, wherein the first client device and the second client device are associated with the user account of the messaging application.

12. The system of claim 10, wherein to capture the context code, the one or more processors execute instructions to scan the context code using a camera of the first client device, and wherein the context code is a quick response (QR) code.

13. The system of claim 10, wherein the context code includes a hash of a self- signed certificate of the second client device or a random cryptographic key generated by the second client device.

14. The system of claim 10, wherein the one or more processors further execute instructions to conduct a handshake with the second client device according to a cryptographic communication protocol.

15. The system of claim 14, wherein to determine the second client device is authorized to receive the dataset, the one or more processors execute instructions to:

determine a first hash of a first self-signed certificate corresponding to the context code generated by the second client device matches a second hash of a second self-signed certificate provided by the second client device during the handshake; or determine a first random cryptographic key generated by the second client device and corresponding to the context code generated by the second client device matches a second random cryptographic key generated by the second client device and provided by the second client device during the handshake.

16. The system of claim 10, wherein the dataset includes a messaging history and a media history associated with the user account of the messaging application.

17. The system of claim 10, wherein the one or more processors further execute instructions to:

receive, from a server associated with the messaging application, a cryptographic key generated by the server and associated with the user account; and encrypt the dataset for a transfer of the dataset from the first client device to the second client device, wherein the dataset is encrypted using the cryptographic key.

18. A non-transitory computer-readable storage medium having instructions embodied thereon, the instructions being executable by one or more processors to perform a method, the method comprising:

capturing, at a first client device hosting a messaging application, a context code generated for display in a graphical user interface of a second client device hosting the messaging application;

conducting a handshake with the second client device according to a cryptographic communication protocol;

determining, based on the context code, the second client device is authorized to receive from the first client device a dataset associated with a user account of the messaging application, wherein determining the second client device is authorized to receive the dataset comprises:

determining a first hash of a first self-signed certificate corresponding to the context code generated by the second client device matches a second hash of a second self-signed certificate provided by the second client device during the handshake; or determining a first random cryptographic key generated by the second client device and corresponding to the context code generated by the second client device matches a second random cryptographic key generated by the second client device and provided by the second client device during the handshake;

establishing, based on determining the second client device is authorized, a peer to-peer connection between the first client device and the second client device;

receiving, from a server associated with the messaging application, a cryptographic key generated by the server and associated with the user account;

encrypting the dataset for a transfer of the dataset from the first client device to the second client device, wherein the dataset is encrypted using the cryptographic key; and transferring, by the peer-to-peer connection, (i) the dataset, and (ii) metadata associated with the dataset from the first client device to the second client device, wherein the metadata includes (i) a hash associated with the user account and (ii) random data used by the server to generate the hash, wherein the random data is a salt associated with the server.

* * * * *